R. H. COLEMAN.
SPOKE BILLET, ART OF MANUFACTURE AND PRODUCT.
APPLICATION FILED APR. 23, 1917.
1,238,890.
Patented Sept. 4, 1917.
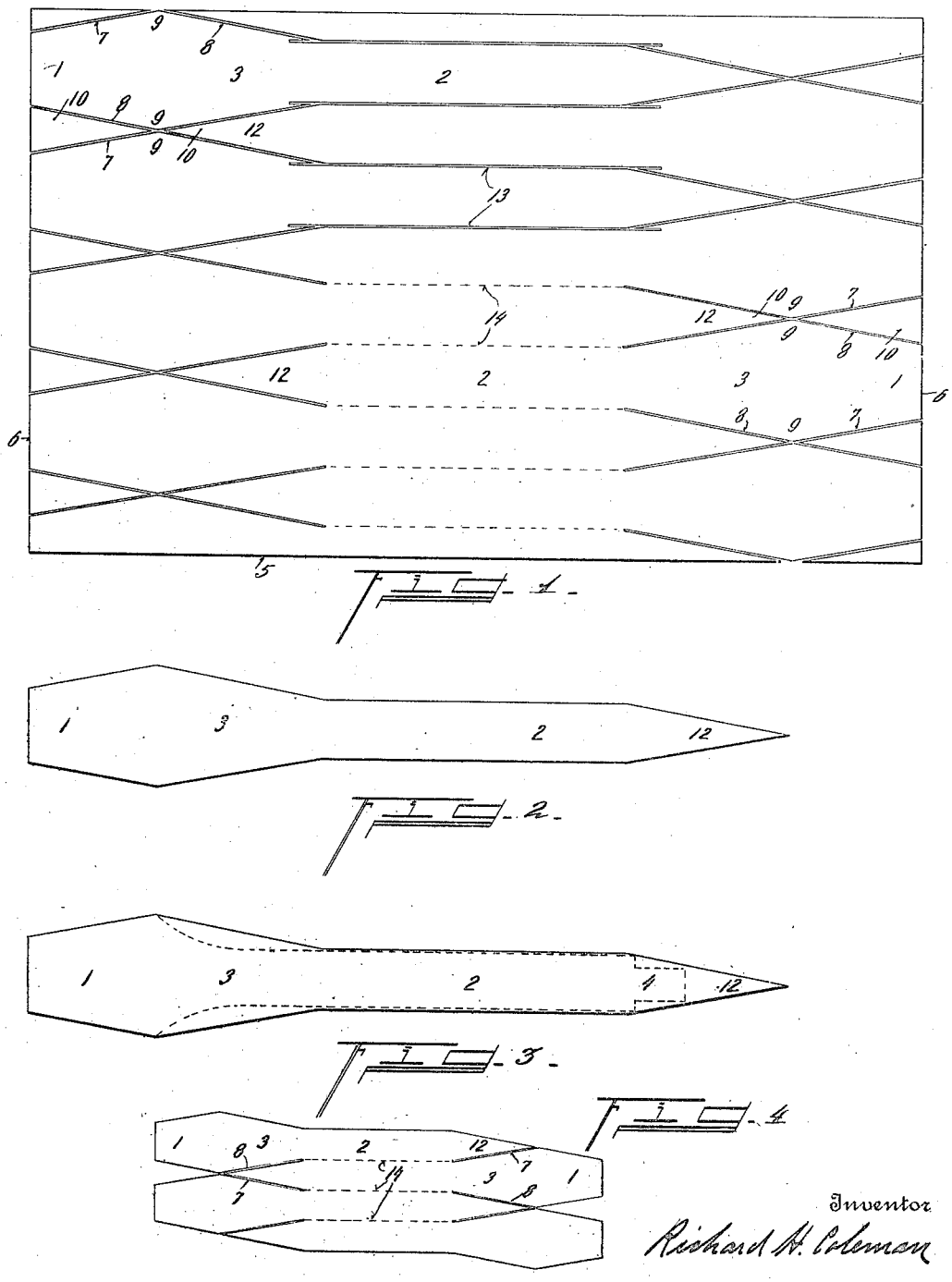

UNITED STATES PATENT OFFICE.

RICHARD H. COLEMAN, OF EUNICE, LOUISIANA.

SPOKE-BILLET, ART OF MANUFACTURE AND PRODUCT.

1,238,890.

Specification of Letters Patent. Patented Sept. 4, 1917.

Application filed April 23, 1917. Serial No. 163,839.

*To all whom it may concern:*

Be it known that I, RICHARD H. COLEMAN, a citizen of the United States, and residing at Eunice, in the parish of Saint Landry and State of Louisiana, have invented a new and useful Improvement in Spoke-Billets, Art of Manufacture and Products, of which the following specification is a full disclosure.

This invention deals with the production of wheel spoke billets and proposes a unique process or method of sawing board material to form spoke billets in gang form, with the billets easily separable one from the other, facilitating the production of sawed billets and furnishing a product characterized by its superior capacities, and uniformity, and made at a cost materially less than by methods now prevailing.

An object of the invention is to render available a manufacturing process enabling spoke billets to be made in gang form from board material and the billets of the gang easily separable one from the other.

Another object of the invention is to formulate a series of cross or intersecting saw cuts or lines at the opposite ends of a board, each cut or line diagonal to the grain of the wood, and all of an approximate uniform length from the end of the board inward, to produce, after the board is sawed, a series of miter cut foot and throat spoke portions of a spoke billet, with such portions of one separated from its next adjacent by the saw cut or kerf and those at one end of the board relatively staggered from those at the opposite end, and by sawing or splitting the intermediate portion of the board longitudinally in parallel lines meeting alined ends of said miter saw cuts.

Another object of the invention is to produce a spoke billet which in an evolutionary form more accurately corresponds to a turned and finished spoke, with a minimum material allowance for finish.

Other objects and advantages will be in part obvious from the accompanying drawings, and in part indicated in the following description thereof, and in such drawings like characters of reference denote corresponding parts throughout the several views, of which:

Figure 1 is a plan view of a board with its ends mitered or sawed for forming into spoke billets arranged in gang form to be separated either by splitting or sawing the intermediate portion of the board along longitudinal and parallel lines extended to meet alined points at opposite inner ends of the miter saw lines.

Fig. 2 is a plan view of an individual spoke billet separated for the board 2 or gang.

Fig. 3 is a plan view similar to Fig. 2, but indicating in dotted lines the outline of a finished spoke to characterize the difference in dimensions between the billet and finished product turned therefrom.

Fig. 4 is a plan view of a gang of form spoke billets cut from a board.

Obtaining the board blank is in the nature of the initial or preparatory step to this method. The blank is accurately cut to a length determined upon for a definite length of spoke, and of a thickness required for the thickness of the spoke foot, which always proportions in a commercial or common design of spoke more than the diameter of the body or barrel portion of the spoke. The design of spoke herein represented and shown in dotted lines, Fig. 3, and to which the method is especially applicable, consists of a miter foot portion 1, in which its miter faces, in a wheel, abut the corresponding faces of a next adjacent spoke, a cylindrical body or barrel portion 2, with a throat portion 3 between the barrel and foot, diminishing in thickness from the foot toward the barrel, flaringly developing to the diameter of the barrel, and a tenon head 4. The spoke design being such as is generally used for automobile wheels. The blank may be of any width, and which is only a factor as to the number of billets capable of being produced to a gang, and for economy should be of a width to accommodate for producing at least two billets. The blank 5 as shown in Fig. 1 is of rectangular outline, with two cross cut ends 6—6, and with such straight sawed ends no squaring is necessary to the spoke foot before chucking the billets in a spoke turning lathe. The squaring and sawing of the board blank can of course be done with any of the standard sawing machines.

The blank length must be sufficient to fully include enough material for two spokes arranged with their body or barrels parallel and their feet alternate to each other, and under such layout it must be recognized as presenting the least quantity of material necessary from which it is possible to produce a given size of spoke.

Such arrangement is carried out in the method and in a very systematic and geometrical form, for rapidly sawing and forming the billets to either furnish individually or in gang, of a plurality of billets connected as a unit to be separated by splitting when required for turning.

A succeeding step is to saw into the opposite cross cut ends of the board blank, a plural series of straight intersecting lines 7—8, each line diagonal to the grain of the wood or crossing miter cuts, with the corresponding parallel lines or cuts in an equally spaced relation, whereby each of two crossing or intersecting lines about the point of intersection will form two adjacent angles 9—9, and two opposite angles 10—10. The angles 9—9 forming sides of foot and throat portions of two adjoining spoke billets, with the foot cut to a proper miter, and provides the billets at such portions separated from each other by the saw kerfs. The parallel spacing of the cuts or lines, it being understood, is of such degree to provide for the proper width of spoke-foot, and also at a required angle for an accurate spoke foot miter. The outer opposite angle 10 represents waste material and the inner opposite angle 10 the pointed barrel ends 12 of the billet, at which the tenon head of the spoke is turned.

Both ends of the board blank are cut or sawed, the duplicate of each, except those at one end occupying a staggered relation from those at the opposite end, bringing the intersecting points of each pair of intersecting lines or cuts central with the spoke barrel portion of which the cross cuts form the pointed head.

Thus each pair of intersecting diagonal cuts forms sides of foot and throat portions of one set of spoke billets and an angle or tapered head of an alternate opposite set of spoke billets.

The intersecting cuts or lines 7, 8, are extended inwardly from the ends of the board blank a distance to bring their extremities at a point approximately in alinement with the inner extremities of the cuts running into the opposite end of the blank, which will enable the billets of the gang to be split or separated by saw parallel cuts extending longitudinally with the blank as shown in saw cut line 13 or dotted lines 14, Fig. 1.

The blank after miter sawing its ends may be referred to as a product of commerce from lumber mill to spoke factory, as billets in gang form to be split or sawed along the longitudinal line 14 to separate the billets.

For some users it may be desirable to partially saw through the material along the billet separating lines to retain the billet in gang, but easily broken apart before chucking in a spoke turning lathe.

The billets in gang form are more convenient to handle in shipping and for storage, and from Fig. 4 it will be observed that I provide an article of manufacture in which the waste ends are severed at the time of sawing.

It is obvious that the miter sawing can be accomplished by a sawing machine especially adapted therefor, as also a feature to lessen the cost of manufacture, and producing accurate forms.

In providing billets with accurately mitered and squared foot portions they can be quickly centered and chucked in the turning lathe, offering a material saving of time and labor to the spoke manufacturer and a means for increasing his capacity, which is further enhanced by the minimum amount of material only required to be turned off for finishing the spoke.

It will thus be seen that the invention is well adapted to achieve the ends aforesaid in a very simple yet expeditious manner, and the method may be practised quite independent of any new special types of machines, and is not a mere function of any given machine.

The miter or diagonal cuts could be made into the opposite ends of log material of the required length and the log afterward sawed into board thickness, within the concept of this invention.

Having described my invention, I claim:

1. A method of the character disclosed consisting in making a series of approximately equal length saw cuts into the opposite cross cut ends of a rectangular wood blank and each cut diagonally to the grain of the blank, corresponding to lines arranged in intersecting pairs, and the pairs of a series in definite spaced relation, and those at one end of the blank in a staggered relation to those at the opposite end.

2. A method of the character disclosed consisting in cutting a series of X-cuts in spaced relation into the opposite cross cut ends of a rectangular wood blank, with the X-cut at one end in a staggered relation to those at the opposite end forming miter cut spoke foot portions at both ends of said blank.

3. A method of the character disclosed consisting in cutting a series of X-cuts in spaced relation into the opposite ends of a rectangular blank for a determined distance with the X-cuts at one end in a staggered relation to those at the opposite end, and cutting the intermediate portion of the blank along spaced longitudinal lines to meet the inner extremities of the said opposite X-cuts at alined points for forming the blanks into spoke billets each with miter cut foot portions.

4. An article of manufacture comprising spoke billets arranged in gangs, having their spoke foot portions at opposite ends relatively alternate and united at the intermediate spoke barrel portion.

5. An article of manufacture comprising a spoke billet having miter sawed spoke foot, throat and head portions.

6. An article of manufacture comprising spoke billets arranged in gangs having their foot portions alternating at opposite ends and separated and united at their intermediate spoke barrel portions, and capable of being split apart.

7. An article of manufacture comprising spoke billets in gangs with miter sawed spoke foot, throat and head portions separated from corresponding portions of a next adjacent arranged relatively alternate with the barrel portions united side by side.

8. An article of manufacture comprising spoke billets in gangs with miter sawed spoke foot, throat and head portions separated from corresponding portions of a next adjacent arranged relatively alternate with the barrel portions united side by side, and longitudinal with the grain of wood, adapting the billets to be separated by splitting.

9. An article of manufacture comprising spoke billets in gangs with finish cut spoke foot, throat and head portions, arranged alternate relative to a next adjacent billet and separated therefrom, and the spoke barrel portion of the series parallel side by side and partially severed.

In witness whereof, I hereunto subscribe my name, as attested by the two subscribing witnesses.

RICHARD H. COLEMAN.

Witnesses:
W. N. RAY,
J. J. STAGG.

Copies of this patent may be obtained for five cents each, by addressing the "C mmissioner of Patents. Washington, D. C."